US011514279B2

(12) United States Patent
Kayahara

(10) Patent No.: US 11,514,279 B2
(45) Date of Patent: Nov. 29, 2022

(54) PRINTING APPARATUS FOR PRINTING IMAGE ON FABRIC FORMED WITH PATTERN AND PRINTING METHOD FOR PRINTING IMAGE ON FABRIC FORMED WITH PATTERN

(71) Applicant: SEIKO EPSON CORPORATION, Tokyo (JP)

(72) Inventor: Naoki Kayahara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/534,880

(22) Filed: Nov. 24, 2021

(65) Prior Publication Data

US 2022/0172011 A1 Jun. 2, 2022

(30) Foreign Application Priority Data

Nov. 27, 2020 (JP) .............................. JP2020-196817

(51) Int. Cl.
*G06K 15/02* (2006.01)
*G06K 15/10* (2006.01)
*G06V 10/75* (2022.01)

(52) U.S. Cl.
CPC ......... *G06K 15/021* (2013.01); *G06K 15/102* (2013.01); *G06K 15/1822* (2013.01); *G06V 10/751* (2022.01)

(58) Field of Classification Search
None
See application file for complete search history.

(56) References Cited

U.S. PATENT DOCUMENTS

| 2003/0030686 | A1 | 2/2003 | Abe et al. | |
| 2004/0239705 | A1* | 12/2004 | Arikita | B41J 3/4078 347/5 |
| 2010/0194807 | A1 | 8/2010 | Hirasawa et al. | |
| 2017/0001432 | A1* | 1/2017 | Ishikawa | B41J 2/04586 |
| 2017/0148154 | A1 | 5/2017 | Nakao | |

FOREIGN PATENT DOCUMENTS

| EP | 3 653 391 A1 | 5/2020 |
| JP | H11-300949 A | 11/1999 |
| JP | 2007-313717 A | 12/2007 |
| JP | 2010-179544 A | 8/2010 |
| JP | 2017-096750 A | 6/2017 |
| WO | 2003/031190 A1 | 1/2005 |

OTHER PUBLICATIONS

Jinxiong REN et al.; "A fine grained digital textile printing system based on image registration"; Computers in Industry 92-93; 2017; pp. 152-160.

* cited by examiner

*Primary Examiner* — Andrew H Lam
(74) *Attorney, Agent, or Firm* — Global IP Counselors, LLP

(57) ABSTRACT

A printing apparatus includes a pattern extracting unit for, based on a comparison between first image data representing a pattern and second image data generated by imaging a fabric transported, extracting a pattern region from the second image data, a printing image generation unit for arranging third image data representing an image to be printed overlaid on the pattern so that the third image data matches the pattern region to generate printing image data, and a printing control unit for causing a printing unit to print the printing image data on the fabric transported.

3 Claims, 9 Drawing Sheets

|  | REFERENCE OF EXTRACTION ||
|  | DIVIDED PATTERN IMAGE DATA 43a | DIVIDED PATTERN IMAGE DATA 43e |
| --- | --- | --- |
| PARTIAL PATTERN REGION 44a | +5 | +1 |
| PARTIAL PATTERN REGION 44d | +5 | +2 |
| PARTIAL PATTERN REGION 44h | +2 | +5 |
| PARTIAL PATTERN REGION 44k | +1 | +5 |
| PARTIAL PATTERN REGION 44m | +5 | +1 |
| PARTIAL PATTERN REGION 44p | +5 | +2 |
| PARTIAL PATTERN REGION 44t | +2 | +5 |
| PARTIAL PATTERN REGION 44w | +1 | +5 |

|  | REFERENCE OF EXTRACTION ||
|  | DIVIDED PATTERN IMAGE DATA 43b | DIVIDED PATTERN IMAGE DATA 43f |
| --- | --- | --- |
| PARTIAL PATTERN REGION 44b | +5 | +1 |
| PARTIAL PATTERN REGION 44e | +5 | +2 |
| PARTIAL PATTERN REGION 44i | +2 | +5 |
| PARTIAL PATTERN REGION 44l | +1 | +5 |
| PARTIAL PATTERN REGION 44n | +5 | +1 |
| PARTIAL PATTERN REGION 44q | +5 | +2 |
| PARTIAL PATTERN REGION 44u | +2 | +5 |
| PARTIAL PATTERN REGION 44x | +1 | +5 |

|  | REFERENCE OF EXTRACTION ||
|  | DIVIDED PATTERN IMAGE DATA 43c | DIVIDED PATTERN IMAGE DATA 43d |
| --- | --- | --- |
| PARTIAL PATTERN REGION 44c | +5 | +2 |
| PARTIAL PATTERN REGION 44f | +5 | +0 |
| PARTIAL PATTERN REGION 44g | +0 | +5 |
| PARTIAL PATTERN REGION 44j | +2 | +5 |
| PARTIAL PATTERN REGION 44o | +5 | +2 |
| PARTIAL PATTERN REGION 44r | +5 | +0 |
| PARTIAL PATTERN REGION 44s | +0 | +5 |
| PARTIAL PATTERN REGION 44v | +2 | +5 |

FIG. 9

PRINTING APPARATUS FOR PRINTING IMAGE ON FABRIC FORMED WITH PATTERN AND PRINTING METHOD FOR PRINTING IMAGE ON FABRIC FORMED WITH PATTERN

The present application is based on, and claims priority from JP Application Serial Number 2020-196817, filed Nov. 27, 2020, the disclosure of which is hereby incorporated by reference herein in its entirety.

BACKGROUND

1. Technical Field

The present disclosure relates to a printing apparatus and a printing method.

2. Related Art

A technique has been known for searching an inspection target image for a candidate having similar characteristics to a model image obtained by imaging a good product serving as a model of the product (see JP 2017-96750 A).

Here, it is assumed that, when a fabric formed with a pattern is used as a printing medium, the pattern is extracted from a captured image obtained by imaging the fabric transported. Distortion, expansion and contraction (hereinafter, distortion, and the like) may be generated in the fabric being transported, and in a situation where such distortion and the like are present, a pattern needs to be extracted from a captured image, or a picture needs to be printed so as to match a pattern. However, when a size of one pattern formed in the fabric is relatively large, extraction accuracy of the pattern from the captured image is easily reduced, and a shift between the picture to be printed and the pattern is easily increased, due to effects of the distortion and the like.

In addition, when the size of one pattern is large, each necessary process such as extracting the pattern from the captured image or generating data for printing cannot be completed within a limited time from capturing the fabric to starting printing in some cases. In this case, transport velocity of the fabric is reduced or the transport is temporarily stopped in order to wait for each necessary process to end, and thus efficiency of printing is reduced.

There is a demand for a device for solving at least one of these problems.

SUMMARY

A printing apparatus includes a transport unit configured to transport a fabric formed with a pattern in a transport direction, an imaging unit configured to image the fabric transported by the transport unit, a printing unit configured to perform printing on the fabric transported by the transport unit, a pattern extracting unit configured to, based on a comparison between first image data representing the pattern and second image data generated by imaging the fabric by the imaging unit, extract a pattern region corresponding to the pattern in the second image data, a printing image generation unit configured to arrange third image data representing an image to be printed overlaid on the pattern so that the third image data matches the pattern region extracted to generate printing image data, and a printing control unit configured to cause the printing unit to print the printing image data on the fabric, wherein the pattern extracting unit compares each of a plurality of divided pieces of first image data obtained by dividing the first image data in at least one of a vertical direction and a horizontal direction with the second image data, to extract, from the second image data, a partial pattern region corresponding to a partial pattern represented by the divided first image data, and the printing image generation unit arranges each of a plurality of divided pieces of third image data obtained by dividing the third image data in at least one of the vertical direction and the horizontal direction, in accordance with the partial pattern region extracted, to generate the printing image data.

A printing method includes a transport step for transporting a fabric formed with a pattern in a transport direction, an imaging step for imaging the fabric transported, a pattern extraction step for, based on a comparison between first image data representing the pattern and second image data generated by imaging the fabric, extracting a pattern region corresponding to the pattern in the second image data, a printing image generation step for arranging third image data representing an image to be printed overlaid on the pattern so that the third image data matches the pattern region extracted to generate printing image data, and a printing step for printing the printing image data on the fabric transported, wherein the pattern extraction step includes comparing each of a plurality of divided pieces of first image data obtained by dividing the first image data in at least one of a vertical direction and a horizontal direction with the second image data, to extract, from the second image data, a partial pattern region corresponding to a partial pattern represented by the divided first image data, and the printing image generation step includes arranging each of a plurality of divided pieces of third image data obtained by dividing the third image data in at least one of the vertical direction and the horizontal direction, in accordance with the partial pattern region extracted, to generate the printing image data.

BRIEF DESCRIPTION OF THE DRAWINGS

FIG. 9 is a diagram showing extraction accuracy of partial pattern regions in a table format.

DESCRIPTION OF EXEMPLARY EMBODIMENTS

Embodiments of the present disclosure will be described below with reference to the accompanying drawings. Note that each of the drawings is merely illustrative for describing the embodiment. Since the drawings are illustrative, proportions and shapes may not be precise, match each other, or some may be omitted.

Figure 1:
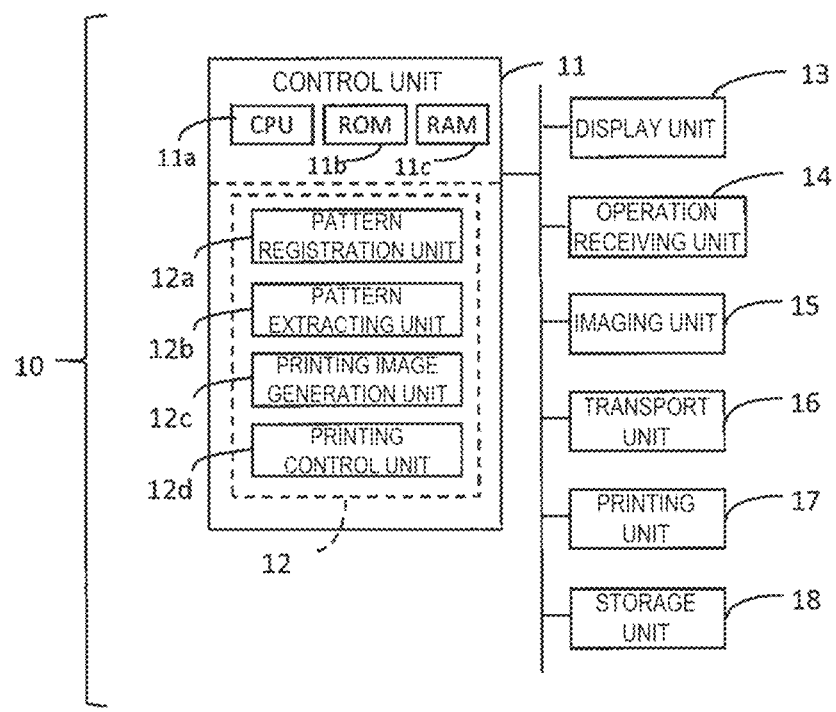
FIG. 1 is a block diagram illustrating a configuration of a printing apparatus in a simplified manner.

1. Apparatus Configuration:

FIG. 1 illustrates a configuration of a printing apparatus 10 according to the embodiment, in a simplified manner.

The printing apparatus 10 performs a printing method. The printing apparatus 10 is provided with a control unit 11, a display unit 13, an operation receiving unit 14, an imaging unit 15, a transport unit 16, a printing unit 17, a storage unit 18, and the like. The control unit 11 is configured to include, as a processor, one or more ICs including a CPU 11a, a ROM 11b, a RAM 11c, and the like, another non-volatile memory, and the like.

In the control unit 11, the processor, that is, the CPU 11a executes arithmetic processing in accordance with one or more programs 12 stored in the ROM 11b, the other memory, or the like, using the RAM 11c or the like as a work area, to control the printing apparatus 10. The control unit 11 functions, in accordance with the program 12, as a pattern registration unit 12a, a pattern extracting unit 12b, a printing image generation unit 12c, a printing control unit 12d, and the like. Note that the processor is not limited to the single CPU, and a configuration may be adopted in which the processing is performed by a hardware circuit such as a plurality of CPUs, an ASIC, or the like, or a configuration may be adopted in which the CPU and the hardware circuit work in concert to perform the processing.

The display unit 13 is a device for displaying visual information, and is configured, for example, by a liquid crystal display, an organic EL display, or the like. The display unit 13 may be configured to include a display and a drive circuit for driving the display. The operation receiving unit 14 is a device for receiving an operation by a user, and is realized, for example, by a physical button, a touch panel, a mouse, a keyboard, or the like. Of course, the touch panel may be realized as a function of the display unit 13. The display unit 13 and the operation receiving unit 14 may be part of the configuration of the printing apparatus 10, or may be peripheral devices externally coupled to the printing apparatus 10.

The transport unit 16 is a mechanism for transporting a printing medium under control by the control unit 11. In the present exemplary embodiment, a fabric is assumed, as the printing medium, formed with a stereoscopic pattern by devising a weaving method of yarns and fibers, such as a jacquard woven fabric or a lace fabric. In the fabric, a certain pattern or a set of certain patterns are formed so as to be aligned repeatedly. In the following, a pattern or a set of patterns will be treated as one pattern.

The transport unit 16 includes, for example, a feeding roller for feeding a fabric before printing, which is wound in a roll shape, to downstream of transport, a belt or roller for further transporting the fabric fed, a winding roller for winding the fabric after the printing in a roll shape and collecting the fabric, a motor for rotating each roller or belt, or the like. In the following, upstream, and downstream of a transport direction by the transport unit 16 are described simply as upstream, and downstream.

The imaging unit 15 images the fabric transported by the transport unit 16 under control by the control unit 11. The imaging unit 15 has a configuration such as a light source that irradiates the fabric, an imaging element that receives reflected light from the fabric, and generates and outputs image data as an imaging result, or the like.

The printing unit 17 performs printing on the fabric transported by the transport unit 16 under control by the control unit 11. The printing unit 17 is provided downstream from the imaging unit 15. The printing unit 17 performs printing on the fabric based on printing image data transmitted from the control unit 11. The printing unit 17 can perform printing by discharging ink of a plurality of colors such as cyan, magenta, yellow, and black, for example, by an ink-jet method. According to the ink-jet method, the printing unit 17 performs printing on the fabric by discharging dots of ink from a nozzle (not illustrated) based on printing image data defining dot on or dot off of each ink for each pixel.

The storage unit 18 is a storage method such as a non-volatile memory or a hard disk drive. The storage unit 18 may be interpreted as a part of the control unit 11. Additionally, the RAM 11c may be interpreted as a part of the storage unit 18.

The printing apparatus 10 may be referred to as a recording device, an image forming device, a printer, or the like. The printing apparatus 10 may be realized not only by a single independent device, but also by a plurality of devices communicatively coupled to each other via a communication interface or a network. The printing apparatus 10 configured by a plurality of devices may be referred to as a printing system 10.

The printing system 10 is configured to include, for example, a printer including the imaging unit 15, the transport unit 16, and the printing unit 17, and one or more information processing devices that function as the control unit 11. The information processing device is, for example, a personal computer (PC), a server, a smart phone, a tablet terminal, or a device having the same degree of processing capability as those devices. In the printing system 10, a device serving as the control unit 11 may be referred to as an image processing apparatus, a printing control device, or the like. Of course, some devices that configure the printing system 10 may be considered as an invention.

Figure 2A:
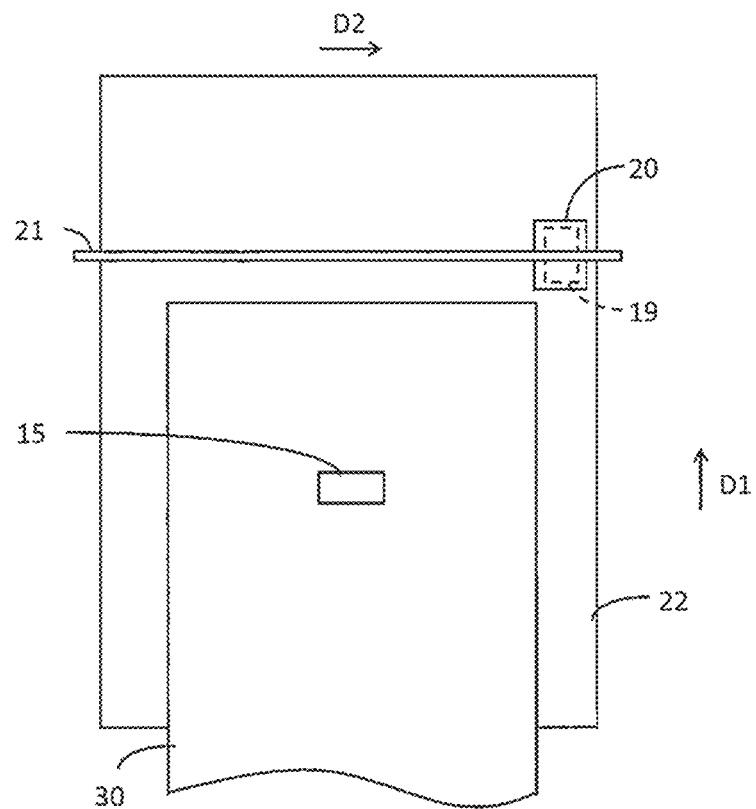
FIG. 2A is a view illustrating a configuration of a fabric to be transported and a vicinity thereof in a perspective facing downward from above.

FIG. 2A illustrates a configuration of a fabric 30 to be transported and a vicinity of the fabric 30 in a perspective facing downward from above. In FIG. 2A, a depiction of a pre-formed pattern in the fabric 30 is omitted. In FIG. 2A, a transport direction of the fabric 30 by the transport unit 16 is denoted by a reference sign D1. A reference sign 22 denotes an endless belt 22 as a portion of the transport unit 16. The fabric 30 in a state of being placed on the endless belt 22 is transported from upstream to downstream by the endless belt 22 rotating.

As illustrated in FIG. 2A, a carriage 20 is arranged above the endless belt 22. The carriage 20 can reciprocate along a direction D2 that intersects the transport direction D1. Although the intersection here is orthogonal, it may be understood that orthogonal includes not only strict orthogonality, but also errors that occur in product manufacturing. The carriage 20 moves along an elongated guide member 21 in the direction D2. The direction D2 is also referred to as a main scanning direction of the carriage 20 and a printing head 19. The direction D2 is also referred to as a width direction of the fabric 30.

The carriage 20 is equipped with the printing head 19. That is, the printing head 19 reciprocates along the width direction D2 with the carriage 20. Such a carriage 20 and a printing head 19 configure the printing unit 17. Although not illustrated, a plurality of nozzles open on a lower surface opposite the endless belt 22 in the printing head 19. The printing head 19 discharges ink from the nozzle based on printing image data while moving along the width direction D2 with the carriage 20.

As illustrated in FIG. 2A, the imaging unit 15 is arranged above the endless belt 22 at a predetermined position upstream of the carriage 20 and the printing head 19.

Figure 2B:
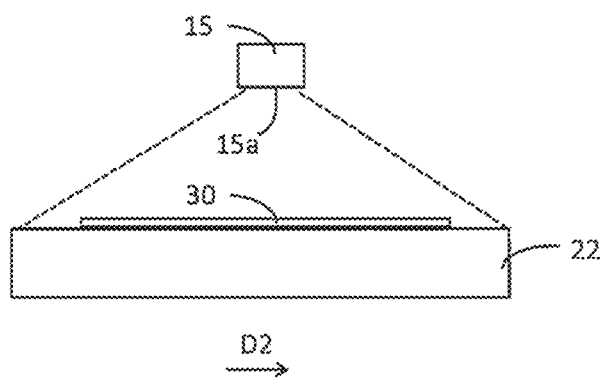
FIG. 2B is a view illustrating a part of the configuration illustrated in FIG. 2A in a perspective facing downstream from upstream.

FIG. 2B illustrates a part of the configuration illustrated in FIG. 2A in a perspective facing downstream from upstream. The imaging unit 15 has a lower surface opposite the endless belt 22 as an imaging surface 15a, and images the fabric 30 above the endless belt 22 via the imaging surface 15a. The imaging unit 15 is, for example, a line scan type camera in which a plurality of imaging elements are arranged inside thereof in the width direction D2. The imaging unit 15 repeats imaging on a line-by-line basis via a lens (not illustrated) and the imaging element provided at the imaging surface 15a. In FIG. 2B, an imaging range in the width direction D2 by the imaging unit 15 is illustrated by dashed lines. The imaging unit 15 is capable of imaging approximately an entire range of the endless belt 22 in the width direction D2 by a function of the lens.

The configuration of the imaging unit 15 is not limited to the example of FIGS. 2A and 2B. For example, a configuration may be adopted in which a plurality of the imaging units 15 are arranged above the endless belt 22 along the width direction D2, and each of the plurality of imaging units 15 takes charge of a partial range of the entire range of the endless belt 22 in the width direction D2 and performs imaging. Alternatively, the imaging unit 15 may be a line sensor configured by arranging the plurality of imaging elements over approximately the entire range of the endless belt 22 in the width direction D2. Alternatively, similar to the printing head 19 mounted on the carriage 20, the imaging unit 15 may be configured to be mounted on a carriage that can move along the width direction D2, and to image above the endless belt 22 while moving in the width direction D2 by the carriage.

Figure 3:
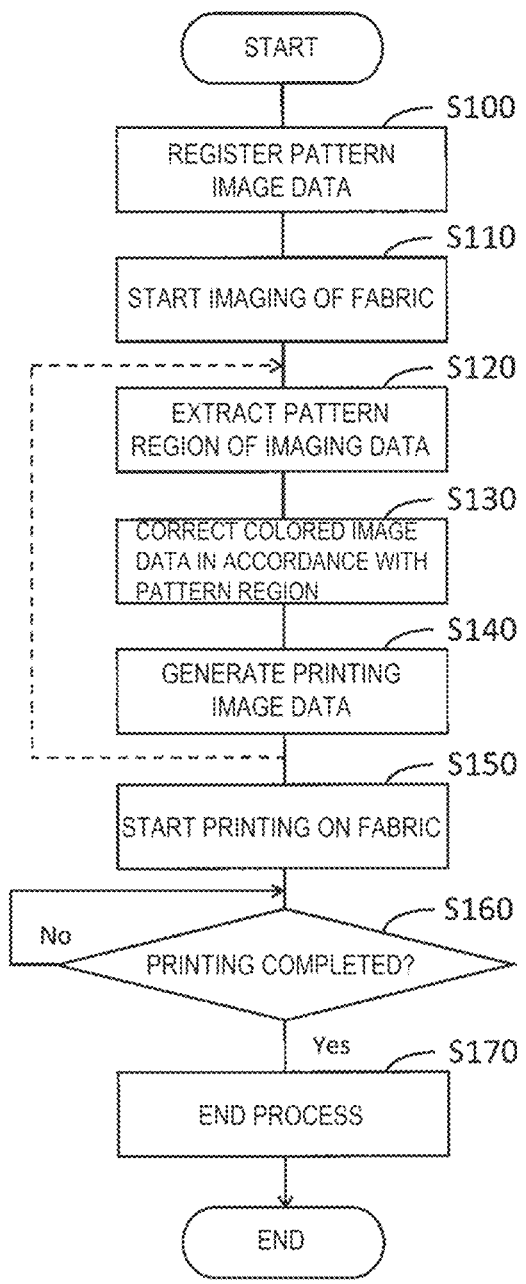
FIG. 3 is a flowchart illustrating printing processing.

2. Printing Method:

FIG. 3 illustrates, by a flowchart, printing processing that the control unit 11 performs in accordance with the program 12.

In step S100, the pattern registration unit 12a of the control unit 11 registers pattern image data representing a pattern formed in the fabric 30 with the storage unit 18. The pattern image data corresponds to "first image data", and step S100 corresponds to a registration step.

Figure 4:
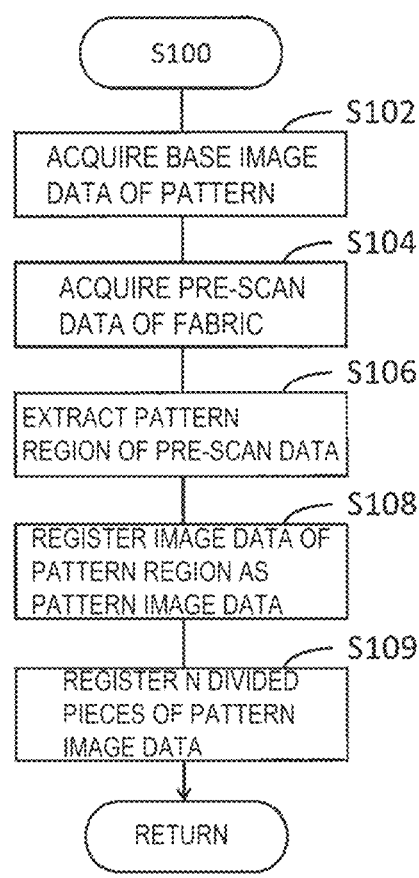
FIG. 4 is a flowchart illustrating details of step S100.

FIG. 4 illustrates details of step S100 by a flowchart.

In step S102, the pattern registration unit 12a acquires base image data representing the pattern in the fabric 30. The fabric 30 is a woven fabric in which, for example, one pattern designed by a designer is woven repeatedly. Therefore, it is assumed that the base image data is image data representing the one pattern that is generated in advance using predetermined software for design or drawing. The pattern registration unit 12a is input with base image data stored in a PC from the PC external to the printing apparatus 10, for example, in accordance with a user operation, and stores the input base image data in the storage unit 18.

In step S104, the pattern registration unit 12a acquires pre-scan data, which is image data generated by pre-scan of the fabric 30. The pre-scan means reading or imaging that is performed before imaging of the fabric 30 to be started in step S110 described below. For example, a user causes a scanner external to the printing apparatus 10 to scan the fabric 30 in advance. Then, the pattern registration unit 12a is input with image data generated by this scan from the scanner, and stores the image data as pre-scan data in the storage unit 18.

Alternatively, the pre-scan may be performed by the imaging unit 15. For example, the control unit 11 causes the transport unit 16 to start transporting the fabric 30, and causes the transport of the fabric 30 to stop at timing at which a tip of the fabric 30 reaches a position, which is downstream from the imaging unit 15 by a predetermined distance. The tip of the fabric 30 is an end portion facing downstream of the fabric 30. The imaging unit 15 images the fabric 30 passing by transporting under the imaging unit 15, and the pattern registration unit 12a is input with image data generated by this imaging from the imaging unit 15 and stores the image data as pre-scan data in the storage unit 18.

In step S106, the pattern registration unit 12a compares the base image data acquired in step S102 with the pre-scan data acquired in step S104 to extract, in the pre-scan data, a pattern region corresponding to one pattern of the fabric 30. At this time, the pattern registration unit 12a uses an image recognition technology to extract an image region with higher similarity with the base image data in the pre-scan data, and uses this image region as the pattern region.

Then, in step S108, the pattern registration unit 12a stores image data corresponding to the pattern region extracted in step S106 in the storage unit 18 as pattern image data. As a result, the pattern image data is registered.

According to the description according to FIG. 4, the pattern image data can be said to be at least a part of the pre-scan data.

However, the pattern registration unit 12a may simplify a part of step S100 by registering base image data itself with the storage unit 18 as pattern image data.

Furthermore, in step S109, the pattern registration unit 12a divides the pattern image data in at least one of a vertical direction and a horizontal direction, and registers N divided pieces of pattern image data with the storage unit 18. N is an integer of 2 or greater. The divided pattern image data corresponds to "divided first image data". In this way, step S100 is completed.

In the present exemplary embodiment, an orientation of each image data, such as pattern image data, imaging data, and printing image data handled by the control unit 11 will also be described corresponding to the transport direction D1 and the width direction D2. For example, it can be interpreted that the transport direction D1 is the vertical direction, and the width direction D2 is the horizontal direction. For example, when the pattern registration unit 12a divides the pattern image data into three equal portions in the vertical direction and three equal portions in the horizontal direction, then N=3×3, thus the pattern image data can be divided into nine divided pieces of pattern image data, and the divided pattern image data can be stored in the storage unit 18.

The number of divisions of the pattern image data in each of the vertical direction and the horizontal direction is predetermined. Alternatively, the pattern registration unit 12a may acquire the number of divisions in each of the vertical direction and the horizontal direction through an operation of the operation receiving unit 14 by the user, and perform step S109. Note that, instead of storing the N divided pieces of pattern image data in step S109, the pattern registration unit 12a may store position information of the N divided pieces of pattern image data in the pattern image data.

Returning to the description of FIG. 3.

In step S110, the control unit 11 causes the imaging unit 15 to start imaging with the fabric 30 as a target that the transport unit 16 transports at predetermined velocity. That is, in step S110, a "transport step" of the fabric 30 is started. In addition, an "imaging step" is started by step S110. Image data on a line-by-line basis generated by the imaging of the fabric 30 by the imaging unit 15 is sequentially output to the control unit 11. The control unit 11 acquires two-dimensional imaging data, by sequentially storing the image data on a line-by-line basis from the imaging unit 15. The imaging data corresponds to "second image data".

In step S120, the pattern extracting unit 12b, based on a comparison between the pattern image data registered in step S100 and the imaging data generated by the imaging in step S110, extracts a pattern region corresponding to the pattern in the fabric 30 in the imaging data. In the imaging data, a plurality of the patterns are represented side by side. Step S120 corresponds to a "pattern extraction step".

Figure 5:
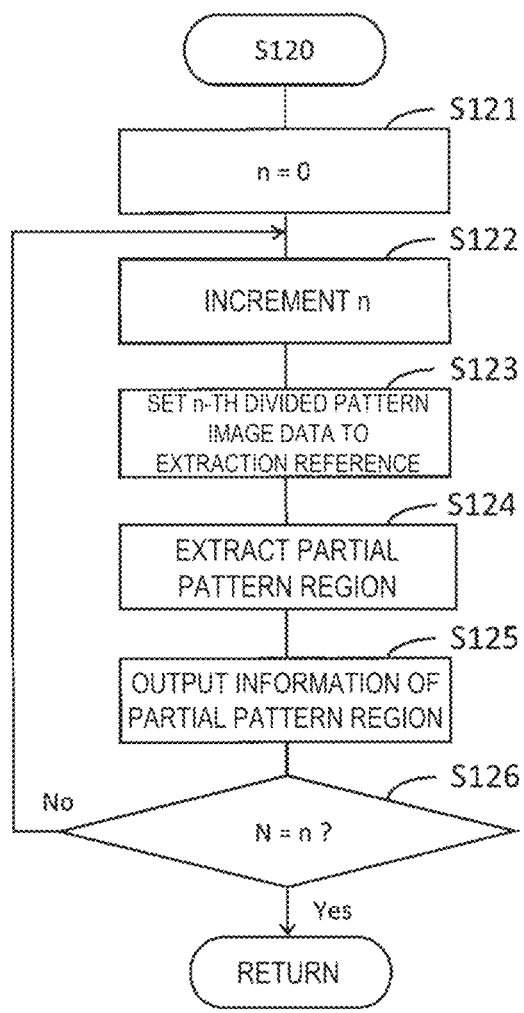
FIG. 5 is a flowchart illustrating details of step S120.

FIG. 5 illustrates details of step S120 by a flowchart.

In step S121, the pattern extracting unit 12b resets a value n representing a number of the divided pattern image data so that n=0. In the present exemplary embodiment, description will be given by assigning numbers from 1 to N to the N divided pieces of pattern image data registered in step S109, respectively.

In step S122, the pattern extracting unit 12b increments n. That is, 1 is added to n, which is current, to update n.

In step S123, the pattern extracting unit 12b sets the n-th divided pattern image data to a reference of extraction.

In step S124, the pattern extracting unit 12b compares the divided pattern image data set as the reference of extraction with the imaging data, to extract, from the imaging data, a partial pattern region corresponding to a partial pattern represented by the divided pattern image data as the reference.

It is sufficient that the pattern extracting unit 12b uses an image recognition technology to extract, as a partial pattern region, an image region having a degree of similarity with the divided pattern image data that is higher than a predetermined level. Specifically, the pattern extracting unit 12b extracts an edge of an image in the divided pattern image data, and similarly extracts an edge of an image in the imaging data. Then, an edge distribution in the divided pattern image data is repeatedly compared with an edge distribution in the imaging data, while a position is shifted, and while the divided pattern image data is deformed, and a region in which a degree of match between the edge distributions is highly evaluated above a predetermined level is extracted as one partial pattern region. With such a process, the pattern extracting unit 12b extracts the partial pattern region from inside the imaging data. Note that, as in the process in step S124, in step S106 described above, the pattern registration unit 12a can extract a pattern region in pre-scan data according to a degree of match of edge distributions between images to be compared.

In step S125, the pattern extracting unit 12b outputs information of the partial pattern region extracted by step S124 to the printing image generation unit 12c for step S130 and subsequent steps. Here, when the width direction D2 is taken as an X-axis, and the transport direction D1 is taken as a Y-axis, coordinates of imaging data are defined in a two-dimensional plane according to the orthogonal X- and Y-axes. The process of extracting a partial pattern region from imaging data is a process of identifying coordinates of the partial pattern region in the imaging data. The coordinates of the partial pattern region are, for example, center coordinates or coordinates of four corners of the partial pattern region. Accordingly, in step S125, it is sufficient that the pattern extracting unit 12b outputs the information of the coordinates of the partial pattern region.

In step S126, the pattern extracting unit 12b determines whether N=n or not, and determines "Yes" when N=n, and ends step S120. N=n at the end of step S125 means that all of the N divided pieces of pattern image data constituting the pattern image data have been set to the reference of extraction in step S123, and step S124 has been completed. On the other hand, when N>n, the pattern extracting unit 12b repeats step S122 and the subsequent steps after determining "No" in step S126.

According to the example of FIG. 5, the pattern extracting unit 12b repeats step S124 N times while setting the first to N-th divided pattern image data to the reference of extraction sequentially one by one according to the flow. However, depending on processing capability of the CPU 11a or the like, the pattern extracting unit 12b may perform extraction of the N types of partial pattern regions performed with the first to N-th divided pattern image data each being the reference of extraction, in parallel in step S120.

A specific example of step S120 will be described with reference to FIG. 6. A reference sign 40 denotes pattern image data 40. The pattern image data 40 is image data that represents a pattern designed with a petal shape as a motif. Of course, such a pattern may be more complex. The pattern image data 40 is divided into four divided pieces of pattern image data 40a, 40b, 40c, and 40d, by being divided into two equal portions in the transport direction D1, and divided into two equal portions in the width direction D2. That is, in the example of FIG. 6, N=4.

Figure 6:
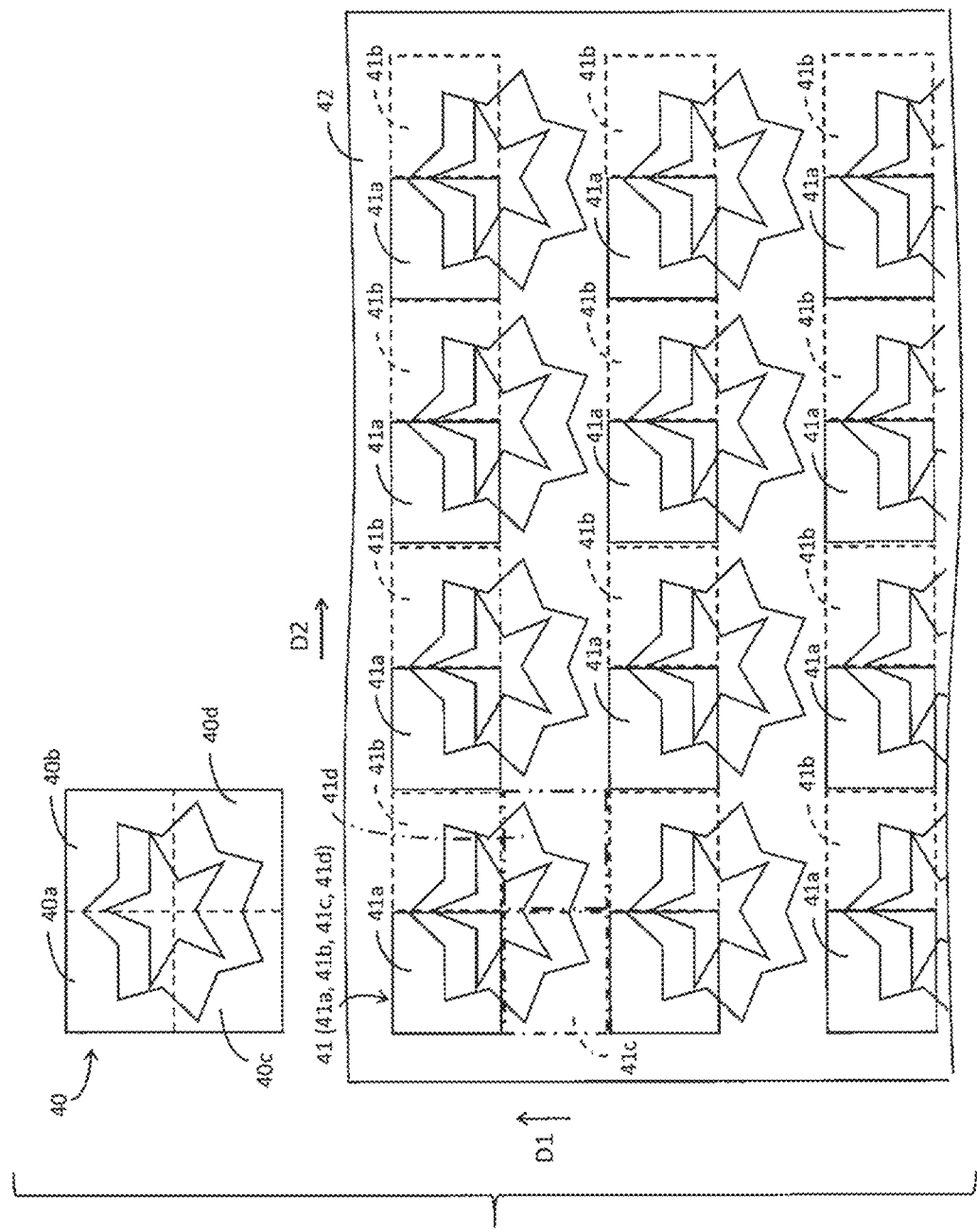
FIG. 6 is a diagram for explaining step S120 by a specific example.

In addition, FIG. 6 illustrates a part of imaging data 42. In the imaging data 42, a pattern similar to the pattern represented by the pattern image data 40 is repeatedly represented along each of the transport direction D1 and the width direction D2. Each rectangle indicated by solid lines in the imaging data 42 is a partial pattern region 41a corresponding to a partial pattern represented by the divided pattern image data 40a. In other words, by setting the divided pattern image data 40a to a reference of extraction, the pattern extracting unit 12b extracts the partial pattern region 41a similar to the divided pattern image data 40a from a plurality of locations in the imaging data 42.

Similarly, each rectangle indicated by dashed lines in the imaging data 42 is a partial pattern region 41b corresponding to a partial pattern represented by the divided pattern image data 40b. By setting the divided pattern image data 40b to a reference of extraction, the pattern extracting unit 12b extracts the partial pattern region 41b similar to the divided pattern image data 40b from a plurality of locations in the imaging data 42. Also, a rectangle indicated by dot-dash lines in the imaging data 42 is one of partial pattern regions 41c corresponding to the divided pattern image data 40c, and similarly, a rectangle indicated by two-dot chain lines in the imaging data 42 is one of partial pattern regions 41d corresponding to the divided pattern image data 40d. Of course, the partial pattern region 41c and the partial pattern region 41d are also extracted from a plurality of locations in the imaging data 42.

A set of the partial pattern regions 41a, 41b, 41c, and 41d form one pattern region 41. In this manner, the process of comparing each of the plurality of divided pieces of pattern image data 40a, 40b, 40c, and 40d constituting the pattern image data 40 with the imaging data 42 to extract the partial pattern regions 41a, 41b, 41c, and 41d by the pattern extracting unit 12b corresponds to a process of extracting the pattern regions 41 from the imaging data 42.

Returning to the description of FIG. 3.

In step S130, the printing image generation unit 12c corrects colored image data that represents an image to be printed overlaid on the pattern in the fabric 30 so as to match a shape of the pattern region extracted in step S120. The colored image data corresponds to "third image data". The colored image data is pre-generated color image data representing a color to color one pattern, or a print range of a color. The colored image data is stored in advance in the storage unit 18, for example. Alternatively, the control unit 11 is input with colored image data stored in a PC from the PC external to the printing apparatus 10, for example, in accordance with a user operation, and stores the input colored image data in the storage unit 18.

A shape of the colored image data is an ideal shape of a pattern region having one pattern, for example, a rectangle. On the other hand, a shape of each pattern region extracted from the imaging data in step S120 is basically a square, but does not necessarily match the shape of the colored image data. This is because distortion, expansion and contraction (hereinafter, distortion, and the like) may be generated in the fabric 30 being transported. Although not particularly depicted in FIG. 6, each of the partial pattern regions 41a, 41b, 41c, and 41d that constitute each of the pattern regions 41 extracted from the imaging data 42 may have a shape that is distorted, expanded, or contracted due to distortion and the like in the fabric 30.

As such, the printing image generation unit 12c deforms each of the plurality of divided pieces of colored image data obtained by dividing the colored image data in at least one of the vertical direction and the horizontal direction so as to match an individual shape of the partial pattern region extracted in step S120. The divided colored image data corresponds to "divided third image data". The printing image generation unit 12c divides the colored image data to acquire N divided pieces of colored image data, by the same division aspect for dividing the pattern image data to acquire the N divided pieces of pattern image data in step S109 by the pattern registration unit 12a. For example, when the pattern registration unit 12a divided the pattern image data into three equal portions in the vertical direction and into three equal portions in the horizontal direction to acquire the nine divided pieces of pattern image data, the printing image generation unit 12c similarly divides the colored image data into three equal portions in the vertical direction and into three equal portions in the horizontal direction to acquire nine divided pieces of colored image data.

Then, the printing image generation unit 12c deforms one divided piece of colored image data so as to match a shape of a partial pattern region in which a position in the pattern region corresponds to a position of the divided colored image data in the colored image data. As a deformation method, for example, an affine transformation including expansion, contraction, rotation, shear, and the like of an image, or another deformation method is used. Such deformation is a correction by step S130. Note that, depending on the shape of the pattern region, the correction in step S130 is not necessary as a result in some cases.

In step S140, the printing image generation unit 12c arranges the plurality of divided pieces of colored image data after step S130 so as to correspond to an array of the partial pattern regions and the pattern regions in the imaging data to generate printing image data. The printing image data is image data in which the plurality of divided pieces of colored image data after step S130 are combined, and is an image printed on a region of the fabric 30 as a target of imaging. Such steps S130 and S140 correspond to a "printing image generation step" of arranging the third image data so as to match the pattern region extracted to generate the printing image data.

Assuming the description for FIG. 6, a specific example of steps S130 and S140 will be described with reference to FIG. 7. A reference sign 50 denotes colored image data 50. The colored image data 50 is color image data representing colors to be colored overlaid on a pattern designed with a petal as a motif. The colored image data 50 may be interpreted as an image having the same or substantially the same size as the pattern image data 40 vertically and horizontally. Similar to the pattern image data 40, the colored image data 50 is divided into two equal portions in the transport direction D1 and divided into two equal portions in the width direction D2, to be divided into four divided pieces of colored image data 50a, 50b, 50c, and 50d.

A reference sign 51a denotes divided colored image data 51a after correcting the divided colored image data 50a so as to match a shape of the partial pattern region 41a constituting one certain pattern region 41. Similarly, a reference sign 51b denotes divided colored image data 51b after correcting the divided colored image data 50b so as to match a shape of the partial pattern region 41b constituting the one pattern region 41. A reference sign 51c is divided colored image data 51c after correcting the divided colored image data 50c so as to match a shape of the partial pattern region 41c constituting the one pattern region 41. A reference sign 51d is divided colored image data 51d after correcting the divided colored image data 50d so as to match a shape of the partial pattern region 41d constituting the one pattern region 41.

Figure 7:
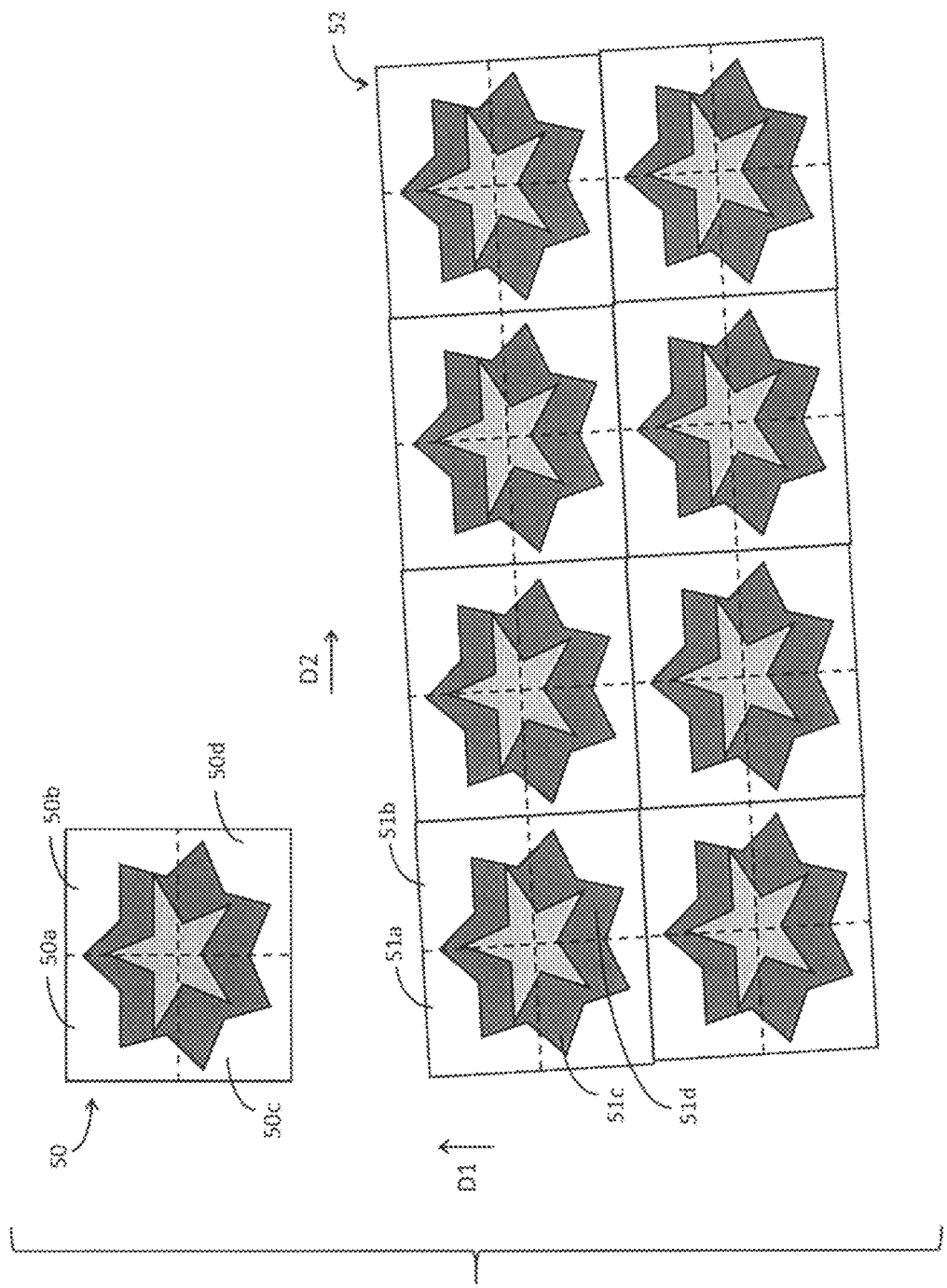
FIG. 7 is a diagram for explaining steps S130 and S140 by a specific example.

In FIG. 7, boundaries of the divided colored image data are partially indicated by broken lines. Additionally, distortion and the like of a pattern caused by distortion and the like of the fabric 30 that is not depicted in FIG. 6 is represented in FIG. 7. It is sufficient that in step S130, the printing image generation unit 12c repeatedly performs the correction of the divided colored image data 50a, 50b, 50c, and 50d for each of the pattern regions 41 constituted by the partial pattern regions 41a, 41b, 41c, and 41d extracted in step S120. Then, the divided colored image data 51a, 51b, 51c, and 51d after such a correction combined according to a positional relationship among the partial pattern regions 41a, 41b, 41c, and 41d in the pattern region 41, and an array of the pattern regions 41 in the imaging data 42, form printing image data 52.

As indicated by a dashed arrow in FIG. 3, the control unit 11, after starting imaging of the fabric 30 in step S110, repeats steps S120 to S140 in accordance with the imaging data obtained sequentially from the imaging unit 15. In other words, the control unit 11 performs step S120 using imaging data of a predetermined size obtained sequentially from the imaging unit 15 as a target, and performs steps S130 and S140 in response to a result of step S120. The printing image data 52 illustrated in FIG. 7 is the printing image data obtained as a result of one cycle of such steps S120 to S140.

In step S150, the printing control unit 12d starts printing of the printing image data generated in step S140 on the fabric 30. In other words, a "printing step" is started by step S150. The printing image generation unit 12c sequentially generates printing image data by repeating step S140, and outputs the printing image data sequentially to the printing control unit 12d in an order of generation. The printing control unit 12d appropriately performs various types of necessary processing such as so-called color conversion processing and halftone processing on the printing image data acquired from the printing image generation unit 12c, to convert the printing image data into printing image data in a format used by the printing unit 17 for printing. The printing control unit 12d may temporarily accumulate the printing image data after such conversion in a buffer.

Then, the printing control unit 12d transfers the printing image data after the above conversion to the printing unit 17, and causes the printing unit 17 to start printing by movement of the carriage 20 and ink discharge from the printing head 19 based on the printing image data at predetermined timing at which a position of the fabric 30 for which imaging is started by step S110 reaches below the printing head 19. As a result, color images represented by the individual colored image data constituting the printing image data are printed overlaid on the pattern in a shape that matches the individual pattern in the fabric 30.

The transport unit 16 is provided with an encoder that detects an amount of rotation of rollers and belts rotating for transport. The printing control unit 12*d* computes a transport distance of the fabric 30 in accordance with a detection signal from the encoder. Accordingly, the printing control unit 12*d* can grasp a current position in the transport direction D1 of the fabric 30 for which imaging is started by step S110, and can cause the printing unit 17 to start printing on the fabric 30 at timing at which the position reaches below the printing head 19.

After printing is started in step S150, the control unit 11 determines whether to end the printing or not (step S160). When ending the printing, the control unit 11 determines "Yes" and proceeds to an end process in step S170. The control unit 11 determines to end the printing when, for example, the end of printing is instructed by a user, or when the transport of the fabric 30 by a predetermined length is completed.

In the end process in step S170, the control unit 11 stops imaging of the fabric 30 by the imaging unit 15. In addition, the control unit 11 stops driving the transport unit 16 and the printing unit 17 after causing the printing unit 17 to perform printing based on the printing image data generated in one cycle of the last steps S120 to S140, and ends the flowchart in FIG. 3. Of course, the control unit 11 may stop the transport unit 16 after controlling a necessary process such as collection of the fabric 30 by a winding roller.

3. Selection of Partial Pattern Regions Based on Accuracy of Extraction:

As described above, the pattern extracting unit 12*b* extracts a partial pattern region by a comparison with imaging data in units of divided pattern image data. In this case, when a plurality of similar partial patterns are included in one pattern, and when one certain divided piece of pattern image data is set to a reference of extraction in step S123, and step S124 is performed, there is a possibility that any of the partial patterns at the plurality of locations is extracted as a partial pattern region. However, from one pattern, a partial pattern region at one location is to be extracted originally based on one divided piece of pattern image data. In view of such a situation, as described below, the pattern extracting unit 12*b* may calculate accuracy of extraction of the partial pattern region in step S120, and select information of the partial pattern region required for processes in step S130 and subsequent steps.

Figure 8:
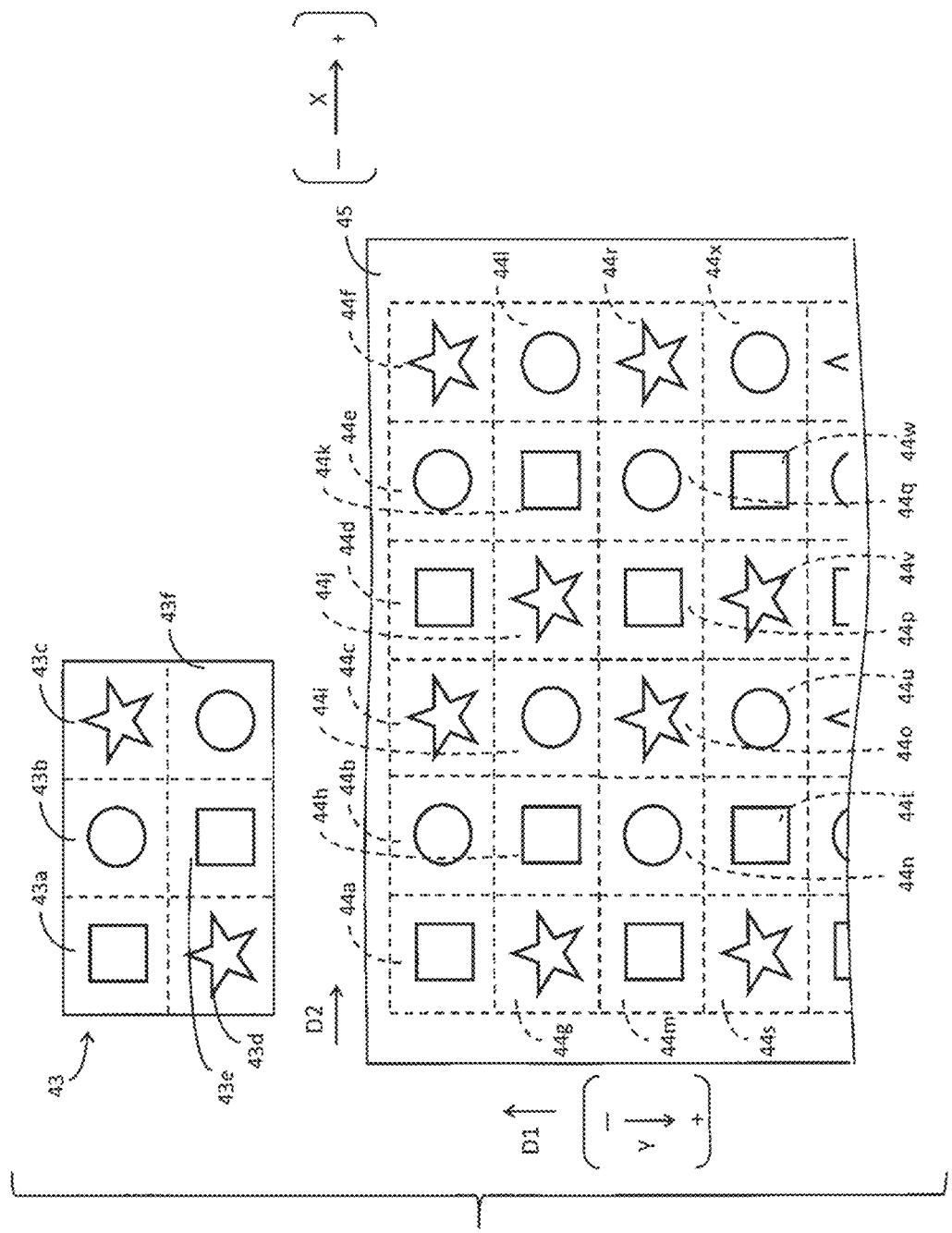
FIG. 8 is a diagram illustrating an example of pattern image data and imaging data different from FIG. 6.

FIG. 8 illustrates an example of pattern image data and imaging data different from FIG. 6. A reference sign 43 denotes pattern image data 43 representing one pattern. The pattern image data 43 is divided into two equal portions in the transport direction D1, and is divided into three equal portions in the width direction D2, to be divided into six divided pieces of pattern image data 43*a*, 43*b*, 43*c*, 43*d*, 43*e*, and 43*f*. That is, in the example of FIG. 8, N=6.

Additionally, in FIG. 8, partial patterns represented by the divided pattern image data 43*a*, 43*b*, 43*c*, 43*d*, 43*e*, and 43*f* respectively are simplified, and drawn by using a square pattern "□", a circle pattern "○", or a star pattern "☆". In this way, for example, the partial pattern represented by the divided pattern image data 43*a*, and the partial pattern represented by the divided pattern image data 43*e* are similar to each other. In addition, the partial pattern represented by the divided pattern image data 43*b* and the partial pattern represented by the divided pattern image data 43*f* are similar to each other. Additionally, the partial pattern represented by the divided pattern image data 43*c* and the partial pattern represented by the divided pattern image data 43*d* are similar to each other.

FIG. 8 illustrates a part of the imaging data 45. In the imaging data 45, a pattern similar to the pattern represented by the pattern image data 43 is repeatedly represented along each of the transport direction D1 and the width direction D2. Rectangles indicated by broken lines in the imaging data 45 are partial pattern regions 44*a*, 44*b*, 44*c*, 44*d*, 44*e*, 44*f*, 44*g*, 44*h*, 44*i*, 44*j*, 44*k*, 44*l*, 44*m*, 44*n*, 44*o*, 44*p*, 44*q*, 44*r*, 44*s*, 44*t*, 44*u*, 44*v*, 44*w*, 44*x*, and the like, extracted by step S124 in FIG. 5.

When step S124 is performed by setting the divided pattern image data 43*a* to a reference of extraction in step S123, the pattern extracting unit 12*b* extracts the partial pattern regions 44*a*, 44*d*, 44*h*, 44*k*, 44*m*, 44*p*, 44*t*, and 44*w*, according to the example in FIG. 8. However, in these partial pattern regions 44*a*, 44*d*, 44*h*, 44*k*, 44*m*, 44*p*, 44*t*, and 44*w*, a partial pattern region to be extracted when the divided pattern image data 43*e* instead of the divided pattern image data 43*a* is set to the reference of extraction is also included. Therefore, the pattern extracting unit 12*b* calculates accuracy of extraction for each partial pattern region extracted in step S124, based on a comparison between a positional relationship between this partial pattern region and other partial pattern regions extracted in a periphery, and a positional relationship among a plurality of divided pieces of pattern image data in the pattern image data. In the following, the accuracy of extraction is also referred to as "extraction accuracy". Each of a plurality of partial pattern regions extracted from a plurality of positions of imaging data corresponding to a partial pattern represented by one certain divided piece of pattern image data corresponds to "first partial pattern region".

Here, the case is used as an example in which when the divided pattern image data 43*a* is set to the reference of extraction, the partial pattern region 44*a* and the partial pattern region 44*h* each being the square pattern "□" have been extracted from the imaging data 45, and a calculation method of extraction accuracy of each of the partial pattern regions 44*a* and 44*h* will be described. In this case, each of the partial pattern regions 44*a* and 44*h* is the first partial pattern region. Note that, the square pattern "□" is a partial pattern region extracted when the divided pattern image data 43*a* or the divided pattern image data 43*e* is set to the reference of extraction. In FIG. 8, for convenience of explanation, the width direction D2 is taken as an X-axis+direction, a reverse direction of the width direction D2 is taken as an X-axis−direction, an upstream direction in the transport direction D1 is taken as a Y-axis+direction, and a downstream direction in the transport direction D1 is taken as a Y axis−direction.

First, the extraction accuracy of the partial pattern region 44*a* is calculated. With reference to a positional relationship among the divided pattern image data 43*a* and the divided pattern image data 43*b*, 43*c*, 43*d*, 43*e*, and 43*f* in the pattern image data 43, a partial pattern region next to the partial pattern region 44*a* in the X-axis+direction is to correspond to the circle pattern "○" in the imaging data 45. The circle pattern "○" is a partial pattern region extracted when the divided pattern image data 43*b* or the divided pattern image data 43*f* is set to the reference of extraction. In the imaging data 45, the partial pattern region 44*b* being the circle pattern "○" is extracted next to the partial pattern region 44*a* in the X-axis+direction, thus the pattern extracting unit 12b sets the extraction accuracy of the partial pattern region 44a to +1 in accordance with this fact.

Similarly, with reference to the positional relationship among the divided pattern image data 43a and the divided pattern image data 43b, 43c, 43d, 43e, and 43f, a partial pattern region two ahead from the partial pattern region 44a in the X-axis+direction (next to the next) is to correspond to the star pattern "☆". The star pattern "☆" is a partial pattern region extracted when the divided pattern image data 43c or the divided pattern image data 43d is set to the reference of extraction. In the imaging data 45, the partial pattern region 44c being the star pattern "☆" is extracted two ahead from the partial pattern region 44a in the X-axis+direction, thus the pattern extracting unit 12b adds +1 to the extraction accuracy of the partial pattern region 44a.

Furthermore, a partial pattern region next to the partial pattern region 44a in the Y-axis+direction is to correspond to the star pattern "☆", and the partial pattern region 44g being the star pattern "☆" is extracted next to the partial pattern region 44a in the Y-axis+direction. Thus, the pattern extracting unit 12b adds +1 to the extraction accuracy of the partial pattern region 44a.

In addition, a partial pattern region one ahead in the X-axis+direction and one ahead in the Y-axis+direction from the partial pattern region 44a is to correspond to the square pattern "□", and the partial pattern region 44h being the square pattern "□" is extracted one ahead in the X-axis+direction and one ahead in the Y-axis+direction from the partial pattern region 44a. Thus, the pattern extracting unit 12b adds +1 to the extraction accuracy of the partial pattern region 44a.

In addition, a partial pattern region two ahead in the X-axis+direction and one ahead in the Y-axis+direction from the partial pattern region 44a is to correspond to the circle pattern "○", and the partial pattern region 44i being the circle pattern "○" is extracted two ahead in the X-axis+direction and one ahead in the Y-axis+direction from the partial pattern region 44a. Thus, the pattern extracting unit 12b adds +1 to the extraction accuracy of the partial pattern region 44a.

As a result of adding to the extraction accuracy in this way, the pattern extracting unit 12b calculates the extraction accuracy as "+5" for the partial pattern region 44a extracted from the imaging data 45 with the divided pattern image data 43a as the reference of extraction. Note that, in the situation in which the pattern image data 43 is divided into six as illustrated in FIG. 8, the extraction accuracy "+5" refers to the highest point of the accuracy of extraction.

Similarly, extraction accuracy of the partial pattern region 44h is calculated. As described above, with reference to the positional relationship among the divided pattern image data 43a and the divided pattern image data 43b, 43c, 43d, 43e, and 43f in the pattern image data 43, a partial pattern region next to the partial pattern region 44h in the X-axis+direction is to correspond to the circle pattern "○" in the imaging data 45, and the partial pattern region 44i being the circle pattern "○" is extracted next to the partial pattern region 44h in the X-axis+direction. Therefore, the pattern extracting unit 12b sets the extraction accuracy of the partial pattern region 44h to +1.

In addition, the partial pattern region 44j being the star pattern "☆" is extracted two ahead in the X-axis+direction from the partial pattern region 44h. Thus, the pattern extracting unit 12b adds +1 to extraction accuracy of the partial pattern region 44h.

However, although a partial pattern region next to the partial pattern region 44h in the Y-axis+direction is to correspond to the star pattern "☆", the partial pattern region 44n being the circle pattern "○" is extracted next to the partial pattern region 44h in the Y-axis+direction. Based on this fact, the pattern extracting unit 12b does not add points to the extraction accuracy of the partial pattern region 44h.

In addition, although a partial pattern region one ahead in the X-axis+direction and one ahead in the Y-axis+direction from the partial pattern region 44h is to correspond to the square pattern "□", the partial pattern region 44o being the star pattern "☆" is extracted one ahead in the X-axis+direction and one ahead in the Y-axis+direction from the partial pattern region 44h. Based on this fact, the pattern extracting unit 12b does not add points to the extraction accuracy of the partial pattern region 44h.

In addition, although a partial pattern region two ahead in the X-axis+direction and one ahead in the Y-axis+direction from the partial pattern region 44h is to correspond to the circle pattern "○", the partial pattern region 44p being the square pattern "□" is extracted two ahead in the X-axis+direction and one ahead in the Y-axis+direction from the partial pattern region 44h. Based on this fact, the pattern extracting unit 12b does not add points to the extraction accuracy of the partial pattern region 44h.

As a result of adding to the extraction accuracy in this way, the pattern extracting unit 12b calculates the extraction accuracy as "+2" for the partial pattern region 44h extracted from the imaging data 45 with the divided pattern image data 43a as the reference of extraction.

That is, even when the partial pattern region 44a and the partial pattern region 44h can be extracted from the imaging data 45 with the divided pattern image data 43a as the reference of extraction, due to a difference in extraction accuracy, it is understood that the partial pattern region 44a is a correct extraction result, and the partial pattern region 44h is an erroneous extraction result, as an extraction result based on the divided pattern image data 43a.

Next, a case is used as an example in which when the divided pattern image data 43b is set to a reference of extraction, the partial pattern region 44b and the partial pattern region 44i each being the circle pattern "○" have been extracted from the imaging data 45, and a calculation method of extraction accuracy of each of the partial pattern regions 44b and 44i will be described.

First, the extraction accuracy of the partial pattern region 44b is calculated. With reference to a positional relationship among the divided pattern image data 43b and the divided pattern image data 43a, 43c, 43d, 43e, and 43f in the pattern image data 43, a partial pattern region next to the partial pattern region 44b in the X-axis−direction in the imaging data 45 is to correspond to the square pattern "□", and the partial pattern region 44a being the square pattern "□" is extracted next to the partial pattern region 44b in the X-axis−direction. Therefore, the pattern extracting unit 12b sets the extraction accuracy of the partial pattern region 44b to +1. In addition, the partial pattern region 44c being the star pattern "☆" is extracted next to the partial pattern region 44b in the X-axis+direction, thus the pattern extracting unit 12b adds +1 to the extraction accuracy of the partial pattern region 44b. In addition, the partial pattern region 44g being the star pattern "☆" is extracted one ahead in the X-axis−direction and one ahead in the Y-axis+direction from the partial pattern region 44b, thus the pattern extracting unit 12b adds +1 to the extraction accuracy of the partial pattern region 44b. In addition, the partial pattern region 44h being the square pattern "□" is extracted next to the partial pattern region 44*b* in the Y-axis+direction, thus the pattern extracting unit 12*b* adds +1 to the extraction accuracy of the partial pattern region 44*b*. In addition, the partial pattern region 44*i* being the circle pattern "○" is extracted one ahead in the X-axis+direction and one ahead in the Y-axis+direction from the partial pattern region 44*b*, thus the pattern extracting unit 12*b* adds +1 to the extraction accuracy of the partial pattern region 44*b*. Accordingly, the pattern extracting unit 12*b* calculates the extraction accuracy as "+5" for the partial pattern region 44*b* extracted from the imaging data 45 with the divided pattern image data 43*b* as the reference of extraction.

Similarly, the extraction accuracy of the partial pattern region 44*i* is calculated. In the imaging data 45, the partial pattern region 44*h* being the square pattern "□" is extracted next to the partial pattern region 44*i* in the X axis−direction. Therefore, the pattern extracting unit 12*b* sets the extraction accuracy of the partial pattern region 44*i* to +1. In addition, the partial pattern region 44*j* being the star pattern "☆" is extracted next to the partial pattern region 44*i* in the X-axis+ direction, thus the pattern extracting unit 12*b* adds +1 to the extraction accuracy of the partial pattern region 44*i*. However, the partial pattern region 44*n* one ahead in the X-axis−direction and one ahead in the Y-axis+direction from the partial pattern region 44*i* is not the star pattern "☆", the pattern extracting unit 12*b* does not add points to the extraction accuracy of the partial pattern region 44*i*, based on this fact. Furthermore, because the partial pattern region 44*o* next to the partial pattern region 44*i* in the Y-axis+ direction is not the square pattern "□", the pattern extracting unit 12*b* does not add points to the extraction accuracy of the partial pattern region 44*i*, based on this fact. Further, the partial pattern region 44*p* one ahead in the X-axis+direction and one ahead in the Y-axis+direction from the partial pattern region 44*i* is not the circle pattern "○", the pattern extracting unit 12*b* does not add points to the extraction accuracy of the partial pattern region 44*i*, based on this fact. Accordingly, the pattern extracting unit 12*b* calculates the extraction accuracy as "+2" for the partial pattern region 44*i* extracted from the imaging data 45 with the divided pattern image data 43*b* as the reference of extraction.

In this way, even when the partial pattern region 44*b* and the partial pattern region 44*i* can be extracted from the imaging data 45 with the divided pattern image data 43*b* as the reference of extraction, it is understood that, due to a difference in extraction accuracy, the partial pattern region 44*b* is a correct extraction result, and the partial pattern region 44*i* is an erroneous extraction result, as an extraction result based on the divided pattern image data 43*b*.

FIG. 9 shows, in a table format, extraction accuracy for each combination of the divided pattern image data as the reference of extraction, and partial pattern region extracted from the imaging data based on the divided pattern image data as the reference of extraction. The pattern extracting unit 12*b* calculates, for each partial pattern region extracted, extraction accuracy from a positional relationship with surrounding partial pattern regions as described above. According to FIG. 9, for example, the partial pattern region 44*a* may be extracted in both a case with the divided pattern image data 43*a* as a reference of extraction, and a case with the divided pattern image data 43*e* as a reference of extraction. However, the extraction accuracy with the divided pattern image data 43*a* as the reference of extraction is "+5", and the extraction accuracy with the divided pattern image data 43*e* as the reference of extraction is "+1", thus it is understood that the partial pattern region 44*a* extracted with the divided pattern image data 43*a* as the reference is a correct extraction result, and the partial pattern region 44*a* extracted with the divided pattern image data 43*e* as the reference is an erroneous extraction result.

It is sufficient that the pattern extracting unit 12*b* performs calculation of such extraction accuracy at the timing of step S125, and, for example, when the extraction accuracy as illustrated in FIG. 9 is obtained, the pattern extracting unit 12*b* selects a partial pattern region having extraction accuracy of "+5", and outputs information of the selected partial pattern region to the printing image generation unit 12*c* as an extraction result. Alternatively, the pattern extracting unit 12*b* selects, out of the partial pattern regions extracted in step S124, a partial pattern region for which calculated extraction accuracy is equal to or greater than a predetermined threshold value, and outputs information of the selected partial pattern region to the printing image generation unit 12*c* as an extraction result. In other words, the pattern extracting unit 12*b* provides an extraction result of a first partial pattern region having relatively high extraction accuracy among first partial pattern regions at a plurality of positions, to the printing image generation unit 12*c* for generation of printing image data.

As will be understood from the description above, calculation of extraction accuracy is performed in a state in which extraction of a plurality of partial pattern regions from a certain area of imaging data is possible, since it is necessary to refer to a positional relationship among the plurality of partial pattern regions extracted. As such, it is sufficient that the pattern extracting unit 12*b* repeats steps S122, S123, and S124 a plurality of times, and for example as illustrated in FIG. 8, at timing after extraction of a partial pattern region of the imaging data 45 using consecutive predetermined sized regions as a target has ended, calculates extraction accuracy for each partial pattern region, and selects a partial pattern region based on the extraction accuracy, in step S125.

The calculation of the extraction accuracy is possible even in a situation in which a group having a plurality of partial pattern regions corresponding to one pattern image data cannot be extracted. It is assumed that, due to velocity at which the imaging data 45 is generated, the pattern extracting unit 12*b* has not acquire a part of the imaging data 45 having the partial pattern regions 44*s*, 44*t*, 44*u*, 44*v*, 44*w*, and 44*x*, at the time of step S120. Even in such a case, the pattern extracting unit 12*b* calculates, for example, extraction accuracy of the partial pattern region 44*m* from a relationship with the partial pattern region 44*n* or the partial pattern region 44*o*.

Specifically, it is sufficient that the pattern extracting unit 12*b* uses, as a parameter, the number of other partial pattern regions referred to in order to calculate the extraction accuracy of the partial pattern region 44*m*, and uses, as extraction accuracy, a ratio of the number of the partial pattern regions for which a positional relationship with the partial pattern region 44*m* coincides with a positional relationship of divided pattern image data in the pattern image data 43. That is, for the partial pattern regions 44*m* extracted with the divided pattern image data 43*a* as the reference, the positional relationship with the partial pattern region 44*n* and the partial pattern region 44*o* referred to coincides with the positional relationship with the divided pattern image data 43*a* and the divided pattern image data 43*b* and the divided pattern image data 43*c*, thus the extraction accuracy is set to 2/2, that is, the extraction accuracy set to 100%. Thus, even when extraction accuracy is calculated as a ratio, it is sufficient that the pattern extracting unit 12*b* selects a partial pattern region with a certain degree of extraction accuracy, using a threshold, for example.

4. Summary:

In this way, according to the present exemplary embodiment, the printing apparatus 10 includes the transport unit 16 configured to transport the fabric 30 formed with a pattern in the transport direction D1, the imaging unit 15 configured to image the fabric 30 transported by the transport unit 16, the printing unit 17 configured to perform printing on the fabric 30 transported by the transport unit 16, the pattern extracting unit 12b configured to, based on a comparison between first image data representing the pattern, and second image data generated by imaging the fabric 30 by the imaging unit 15, extract a pattern region corresponding to the pattern in the second image data, the printing image generation unit 12c configured to arrange third image data representing an image to be printed overlaid on the pattern so that the third image data matches the pattern region extracted to generate printing image data, and the printing control unit 12d configured to cause the printing unit 17 to print the printing image data on the fabric 30. Then, the pattern extracting unit 12b compares each of a plurality of divided pieces of first image data obtained by dividing the first image data in at least one of a vertical direction and a horizontal direction with the second image data, to extract, from the second image data, a partial pattern region corresponding to a partial pattern represented by the divided first image data. The printing image generation unit 12c arranges each of a plurality of divided pieces of third image data obtained by dividing the third image data in at least one of the vertical direction and the horizontal direction in accordance with the partial pattern region extracted to generate the printing image data.

According to the above configuration, the pattern extracting unit 12b performs comparison with the second image data not in units of the first image data, but in units of the divided first image data, to extract the partial pattern region from the second image data. As a result, even when distortion and the like occur in the fabric 30, or a size of the first image data is large, effects thereof can be reduced to appropriately extract a partial pattern region, and as a result, a pattern region, which is a collection of the partial pattern regions, can be extracted with high precision. In addition, the printing image generation unit 12c arranges the divided third image data in units of the divided third image data so as to correspond to the partial pattern region to generate the printing image data. Therefore, compared to a case where the third image data is arranged in units of the third image data so as to match a pattern region to perform printing, a fine adjustment and correction are easy to achieve, and a shift between the pattern and the image to be printed overlaid on the pattern is easily reduced.

In addition, as can be seen from FIG. 2A, a distance between the imaging unit 15 and the printing head 19 in the transport direction D1 is determined according to product standards. The control unit 11, which has acquired the second image data generated by the imaging unit 15 imaging the fabric 30 being transported, needs to end the generation of the printing image data required for starting printing before the fabric 30 reaches the printing head 19. However, when each pattern formed in the fabric 30 is large, and the printing image data is generated after the pattern region corresponding to one pattern is extracted from the second image data, it is too late to start printing on the fabric 30, thus there is a need to reduce transport velocity of the fabric 30, or to suspend the transport. With respect to such a disadvantage, in the present exemplary embodiment, the partial pattern region is extracted from the second image data in units of the divided first image data, so as to match the partial pattern region in units of the divided third image data, to generate the printing image data. As a result, the printing image data can be generated sequentially without waiting one entire pattern being imaged or an entire pattern region being extracted, and a decrease in printing efficiency can be avoided.

The present exemplary embodiment includes a configuration in which the pattern extracting unit 12b treats divided first image data obtained by dividing first image data only in a vertical direction, and the printing image generation unit 12c treats divided third image data by dividing third image data only in the vertical direction. Similarly, the present exemplary embodiment includes a configuration in which the pattern extracting unit 12b treats divided first image data obtained by dividing first image data only in a horizontal direction, and the printing image generation unit 12c treats divided third image data by dividing third image data only in the horizontal direction.

Additionally, according to the present exemplary embodiment, the pattern extracting unit 12b, when extracting first partial pattern region corresponding to a partial pattern represented by one divided piece of first image data from a plurality of positions of the second image data, calculates accuracy of extraction, for each of the first partial pattern regions at the plurality of positions, based on a comparison between a positional relationship between the first partial pattern region and another partial pattern region extracted around the first partial pattern region, and a positional relationship among a plurality of the divided pieces of first image data in the first image data. Then, an extraction result of the first partial pattern region, where the accuracy is relatively high, among the first partial pattern regions at the plurality of positions, is provided to the printing image generation unit 12c for generation of printing image data.

According to the above configuration, the pattern extracting unit 12b, by calculating the accuracy of extraction, or extraction accuracy, on the partial pattern region, can eliminate the partial patterned region that was erroneously extracted from the second image data by a comparison with the divided first image data, and provide information of the partial pattern region extracted correctly for generation of printing image data. As a result, for example, generation of printing image data by combining divided third image data with an erroneous arrangement can be avoided, and printing quality can be ensured.

The present exemplary embodiment also discloses an invention of various categories, such as a system, a program, and a method other than the printing apparatus 10.

A printing method includes a transport step for transporting the fabric 30 formed with a pattern in the transport direction D1, an imaging step for imaging the fabric 30 transported, a pattern extraction step for, based on a comparison between first image data representing the pattern and second image data generated by imaging the fabric 30 to extract a pattern region corresponding to the pattern in the second image data, a printing image generation step for arranging third image data representing an image to be printed overlaid on the pattern so that the third image data matches the pattern region extracted to generate printing image data, and a printing step for printing the printing image data on the fabric 30 transported. Then, the pattern extraction step includes comparing each of a plurality of divided pieces of first image data obtained by dividing the first image data in at least one of a vertical direction and a horizontal direction with the second image data, to extract, from the second image data, a partial pattern region corresponding to a partial pattern represented by the divided first image data, and the printing image generation step includes arranging each of a plurality of divided pieces of third image data obtained by dividing the third image data in at least one of the vertical direction and the horizontal direction so as to match the partial pattern region extracted to generate the printing image data.

In the example in FIG. 2A, the configuration of a so-called serial printer has been disclosed in which the printing head 19 is moved while being mounted on the carriage 20, but the printing head 19 may be a so-called line type head. That is, the printing head 19 may be an elongated printing head that is not mounted on the carriage 20 and that can cover a width of the fabric 30 along the width direction D2.

In FIGS. 2A and 2B, the configuration denoted by the reference sign 22 need not be the endless belt, and may be a platen as a platform that supports the fabric 30 from below. That is, it may be understood that the fabric 30 transported by a roller (not illustrated) moves over the platen.

The present exemplary embodiment can also be applied to a case where a material other than the fabric 30, for example, a paper printing medium, formed with a pattern is used for printing.

What is claimed is:

1. A printing apparatus, comprising:
    a transport unit configured to transport a fabric formed with a pattern in a transport direction;
    an imaging unit configured to image the fabric transported by the transport unit;
    a printing unit configured to perform printing on the fabric transported by the transport unit;
    a pattern extracting unit configured to, based on a comparison between first image data representing the pattern and second image data generated by imaging the fabric by the imaging unit, extract a pattern region corresponding to the pattern in the second image data;
    a printing image generation unit configured to arrange third image data representing an image to be printed overlaid on the pattern so that the third image data matches the pattern region extracted, to generate printing image data; and
    a printing control unit configured to cause the printing unit to print the printing image data on the fabric, wherein
    the pattern extracting unit compares each of a plurality of divided pieces of first image data obtained by dividing the first image data in at least one of a vertical direction and a horizontal direction with the second image data, to extract, from the second image data, a partial pattern region corresponding to a partial pattern represented by the divided first image data, and
    the printing image generation unit arranges each of a plurality of divided pieces of third image data obtained by dividing the third image data in at least one of the vertical direction and the horizontal direction, in accordance with the partial pattern region extracted, to generate the printing image data.

2. The printing apparatus according to claim 1, wherein the pattern extracting unit,
    when extracting first partial pattern region corresponding to a partial pattern represented by one piece of the divided first image data from a plurality of positions of the second image data, calculates accuracy of extraction, for each of the first partial pattern regions at the plurality of positions, based on a comparison between a positional relationship between the first partial pattern region and another partial pattern region extracted around the first partial pattern region, and a positional relationship among the plurality of divided pieces of first image data in the first image data, and
    provides an extraction result of the first partial pattern region, where the accuracy is relatively high, among the first partial pattern regions at the plurality of positions to the printing image generation unit for generation of the printing image data.

3. A printing method, comprising:
    a transport step for transporting a fabric formed with a pattern in a transport direction;
    an imaging step for imaging the fabric transported;
    a pattern extraction step for, based on a comparison between first image data representing the pattern and second image data generated by imaging the fabric, extracting a pattern region corresponding to the pattern in the second image data;
    a printing image generation step for arranging third image data representing an image to be printed overlaid on the pattern so that the third image data matches the pattern region extracted, to generate printing image data; and
    a printing step for printing the printing image data on the fabric transported, wherein
    the pattern extraction step includes comparing each of a plurality of divided pieces of first image data obtained by dividing the first image data in at least one of a vertical direction and a horizontal direction with the second image data, to extract, from the second image data, a partial pattern region corresponding to a partial pattern represented by the divided first image data, and
    the printing image generation step includes arranging each of a plurality of divided pieces of third image data, obtained by dividing the third image data in at least one of the vertical direction and the horizontal direction, in accordance with the partial pattern region extracted, to generate the printing image data.

* * * * *